(12) United States Patent
Belamant

(10) Patent No.: US 8,768,776 B2
(45) Date of Patent: Jul. 1, 2014

(54) VERIFICATION OF A TRANSACTOR'S IDENTITY

(75) Inventor: Serge Christian Pierre Belamant, Sandton (ZA)

(73) Assignee: Net 1 UEPS Technologies, Inc., Johannesburg (ZA)

( * ) Notice: Subject to any disclaimer, the term of this patent is extended or adjusted under 35 U.S.C. 154(b) by 1043 days.

(21) Appl. No.: 12/515,085

(22) PCT Filed: Nov. 15, 2007

(86) PCT No.: PCT/IB2007/054659
§ 371 (c)(1),
(2), (4) Date: Jan. 5, 2010

(87) PCT Pub. No.: WO2008/059458
PCT Pub. Date: May 22, 2008

(65) Prior Publication Data
US 2012/0123879 A1    May 17, 2012

(51) Int. Cl.
*G06Q 20/00* (2012.01)
(52) U.S. Cl.
USPC .......... 705/18; 705/44; 705/64; 705/67; 705/72
(58) Field of Classification Search
None
See application file for complete search history.

(56) References Cited

U.S. PATENT DOCUMENTS

| | | | |
|---|---|---|---|
| 5,343,529 A | 8/1994 | Goldfine et al. | 380/23 |
| 5,475,756 A | 12/1995 | Merritt | 380/24 |
| 5,668,876 A | 9/1997 | Falk et al. | 380/25 |
| 5,748,765 A * | 5/1998 | Takhar | 382/124 |
| 6,247,000 B1 | 6/2001 | Hawkins et al. | 705/37 |
| 6,676,017 B1 | 1/2004 | Smith, III | 238/380 |
| 6,879,966 B1 | 4/2005 | Lapsley et al. | 705/50 |
| 7,152,045 B2 | 12/2006 | Hoffman | 705/50 |
| 7,565,329 B2 | 7/2009 | Lapsley et al. | 705/35 |
| 7,587,349 B2 * | 9/2009 | Gottlieb et al. | 705/35 |
| 7,881,997 B2 * | 2/2011 | Scanlan et al. | 705/35 |

(Continued)

FOREIGN PATENT DOCUMENTS

| | | |
|---|---|---|
| WO | WO 00/45320 | 8/2000 |
| WO | WO 00/46710 | 8/2000 |
| WO | WO 2006/022580 | 3/2006 |

OTHER PUBLICATIONS

Li et al., "Biometric-based personal identity-authentication system and security analysis," *The Journal of China Universities of Posts and Telecommunications*, 13(4):43-47, 2006.

*Primary Examiner* — Fateh Obaid
(74) *Attorney, Agent, or Firm* — Dentons US LLP

(57) ABSTRACT

A system for facilitating a financial transaction between a prospective transactor and a transactee has an identity and account verifying facility for verifying the identity of the prospective transactor and an account that the prospective transactor has with a financial institution, the identity and account verifying facility being operated by an independent verifier. The identity and account verifying facility includes a storage means for storing an identifier of the prospective transactor and details of at least one account held by the transactor at the financial institution. An identifier input means is provided whereby the transactor enters his identifier when he subscribes to the service. An account details obtaining means for obtaining details of the transactor's account with the financial institution, an identifier input means whereby the transactor enters his identifier; and a communicating means for communicating with the independent verifier are located at the transactee, for furnishing the account details and the identifier to the verifier and for receiving a verification confirmation or rejection from the verifier, prior to the transactor conducting the financial transaction with the transactee.

5 Claims, 1 Drawing Sheet

(56) References Cited

U.S. PATENT DOCUMENTS

| | | | |
|---|---|---|---|
| 7,905,399 B2* | 3/2011 | Barnes et al. | 235/381 |
| 7,909,247 B2* | 3/2011 | Bonalle et al. | 235/380 |
| 8,117,129 B2* | 2/2012 | Saunders et al. | 705/44 |
| 2001/0039533 A1* | 11/2001 | Pare et al. | 705/39 |
| 2004/0015450 A1 | 1/2004 | Zingher et al. | 235/379 |
| 2006/0278704 A1* | 12/2006 | Saunders et al. | 235/382 |
| 2008/0249939 A1 | 10/2008 | Veenstra | 705/44 |
| 2008/0319902 A1 | 12/2008 | Chazan et al. | 705/42 |
| 2009/0100499 A1 | 4/2009 | Bauer et al. | 726/1 |

* cited by examiner

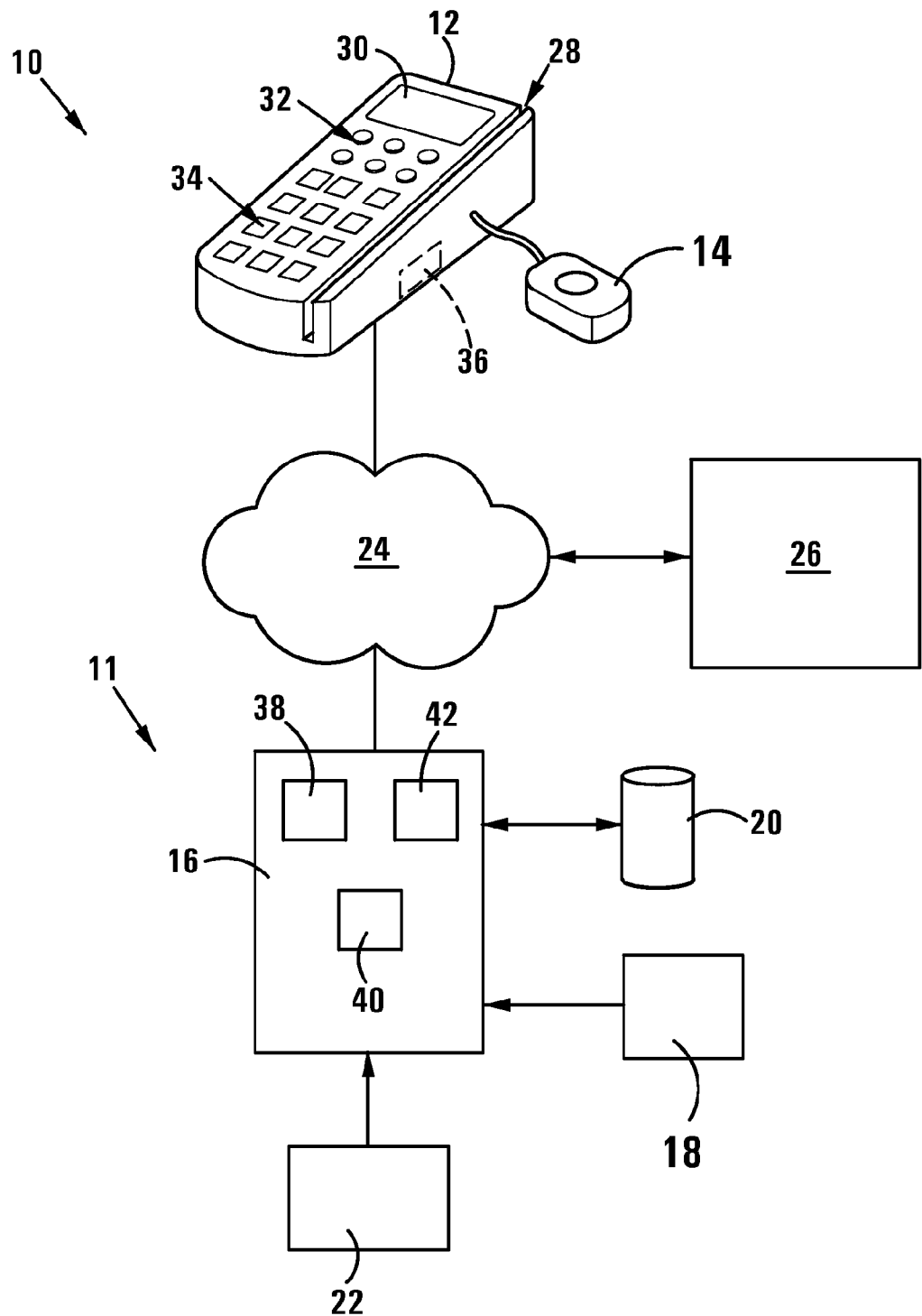

VERIFICATION OF A TRANSACTOR'S IDENTITY

This application is a national stage application under 35 U.S.C. §371 of International Application No. PCT/IB2007/054676 filed Nov. 16, 2007, which claims the priority of South African Patent Application Ser. No. 2006/09535, filed Nov. 16, 2006.

This invention relates to the verification of a potential transactor's identity prior to the transactor conducting an electronic financial transaction. More particularly it relates to a system and method for verifying the identity of a transactor prior to the transactor conducting an electronic financial transaction.

Generally according to the invention an identifier supplied by a prospective financial transactor is stored by a third party verifier who will not be a party to the transaction, and the identifier is then verified by the verifier, for a merchant or financial institution with whom the transactor wishes to transact (the "transactee"), prior to the transactee proceeding with the transaction, in order to satisfy the transactee that the person purporting to be the transactor is the transactor. It will be appreciated that the third party will satisfy itself as to the identity of the prospective transactor.

The identifier may be a PIN or a biometric scan.

It will be appreciated that the transaction may, in particular, be a point-of-sale (POS) transaction, with the merchant needing to check the identity of the prospective transactor. The identifier may be linked to an account of the transactor held at a financial institution, or to several accounts with the same or different financial institutions. The verifier may confirm that the transactor has the relevant accounts with the financial institutions when the transactor subscribes to the service offered by the verifier.

Thus, according to a first aspect of the invention there is provided a system for facilitating a financial transaction between a prospective transactor and a transactee, which includes an identity and account verifying facility for verifying the identity of the prospective transactor and an account that the prospective transactor has with a financial institution, the identity and account verifying facility being operated by an independent verifier.

Further according to the first aspect of the invention there is provided a method of facilitating a financial transaction between a prospective transactor and a transactee, which includes verifying the identity of the prospective transactor and an account that he has with a financial institution, prior to the transactor conducting an electronic financial transaction, by an independent verifier.

The identity and account verifying facility may include a storage means for storing an identifier of the prospective transactor and details of at least one account held by the transactor at the financial institution. It may also have an identifier input means whereby the transactor may enter his identifier and an account details obtaining means for obtaining details of the account(s) held by the prospective transactor with the financial institution.

The verifier may check the financial account details and may thus have a communicating means for communicating with the financial institution to confirm the financial account details with the relevant financial institution. The verifier may also have a receiving means for receiving the identifier and account details of the prospective transactor from the transactee, which are to be verified; and a replying means for replying to a transactee, in response to a request to verify the identifier and account details of the prospective transactor.

Preferably, data will be sent to the verifier in an encrypted form, so that the identity and account verifying facility may also include a decrypting means for decrypting the encrypted data.

Clearly, the verifier will satisfy itself that the person purporting to be the holder of the account is indeed that person. This may be effected by reference to an ID document of the person. Further, the identity and account verifying facility will be in an extremely secure environment.

According to a second aspect of the invention there is provided a system for verifying particulars of a transactor prior to the transactor conducting an electronic financial transaction which includes an account details obtaining means for obtaining details of an account with a financial institution held by the prospective transactor;

an identifier input means whereby the transactor may enter his identifier; and a communicating means for communicating with an independent third party verifier for furnishing the account details and the identifier to the verifier and for receiving a verification confirmation or rejection from the verifier.

It will be appreciated that the account details supplying means, the identifier input means and the communicating means will be located at the prospective transactee.

Further according to the second aspect of the invention there is provided a method for verifying particulars of a transactor prior to the transactor conducting an electronic financial transaction, in which a prospective transactee obtains details of an account with a financial institution held by the prospective transactor;

obtains an identifier of the prospective transactor form the prospective transactor; and communicates the account details and the identifier to an independent third party verifier; and receives a verification confirmation or rejection from the verifier.

The system according to the second aspect of the invention may include a personal information obtaining means for obtaining information about the prospective transactor.

Further according to the second aspect of the invention there is provided a point-of-sale device which is programmed to send account details and an identifier of a prospective transactor to an independent verifier for verification prior to commencing a financial transaction.

The second aspect of the invention accordingly extends to a method of programming a point-of-sale device to send account details and an identifier of a prospective transactor to an independent verifier for verification prior to commencing a financial transaction.

The system according to the second aspect of the invention may have an encryption means for encrypting data to be sent to the verifier.

The identifier may be biometric, in which case the identifier input means may be a biometric scanner. Instead, the identifier may be a PIN, in which case the identifier input means may be a keypad.

Those skilled in the art will still further be aware that most POS transactions use a card, either with a magnetic strip or a chip (the so-called "smart card"), and that details of the account, such as the account number, are stored on the card. Thus, the account details obtaining means may conveniently be a card reader.

The identifier used by the verifier may be the same as, or different from, an identifier used by the prospective transactor with his account.

The invention will now be described by way of a non-limiting example, with reference to the accompanying diagrammatic drawing, which shows schematically a system for facilitating a financial transaction between a prospective transactor and a transactee and a system for verifying particulars of a prospective transactor prior to an electronic financial transaction being conducted, in accordance with the invention.

In the drawing, reference numeral 10, generally refers to a system for verifying particulars of a prospective transactor prior to an electronic financial transaction being conducted, and reference numeral 11 generally refers to a system for facilitating the transaction, in accordance with the invention. The system 10 has a point-of-sale ("POS") device 12 and a fingerprint scanner 14. The system 11 has a processor 16, a further fingerprint scanner 18, a storage device 20 and a card reader 22. The system 11 comprises an identity and account verifying facility. The card reader 22 reads either magnetic strip or smart cards, either debit, credit or cheque. The POS device 12 is connected with the processor 16 via a communications network 24 which could be the Internet or a private network. The POS device 12 also communicates with a computer installation 26 of an acquiring bank via the network 24. The POS device 12 has a magnetic card reader 28, a display 30, control buttons 32, a keypad 34 and an encrypter 36. The processor 16 further has a receiver module 38 which receives data from the POS device 12, a decrypter 40 for decrypting encrypted data and a replying module 42 for sending a reply message to the POS device 12.

The POS device 12 and scanner 14 are located at a merchant, and the identity and account verifying facility constituted by the processor 16, scanner 18, storage device 20 and card reader 22 are located at, and operated by, a trusted independent verifier.

It will be further appreciated that the POS device is a conventional device that is modified and programmed to operate in accordance with the invention.

In use, a person who wishes to subscribe to a verification service offered by the verifier has his cards read, using the reader 22, to provide his account details, and has his fingerprint scanned by the scanner 18. His identity is carefully checked, for example by reference to his ID book or card. His identity may also be checked by checking his fingerprint with that on an official government database. His accounts are checked by contacting the relevant banks or other financial institutions. His name, his account numbers and his fingerprint are then encrypted and stored on the storage device 20.

When the person wants to perform a financial transaction at the merchant, the card that he wishes to use is read by swiping it through the card reader 28 of the POS device 12 and his fingerprint is scanned by the scanner 14. His name and account number, which are obtained from the card, and the fingerprint scan are then encrypted, by the encrypter 36 and transmitted to the processor 16. This data is received by the receiver module 38 and then decrypted by the decrypter 40 and the person's name and fingerprint are then compared with the corresponding information stored against the account number in the storage device 20. If they are the same (or sufficiently similar) then the identity of the prospective transactor is verified and a suitable approval signal is sent to the POS device 12 via the replying module 42. If they are sufficiently different, then an appropriate denial signal is sent to the POS device 12. The result of the verification is displayed on the display 30. If the identity of the prospective transactor has been verified then the financial transaction proceeds automatically as normal. If the particulars of the person are not verified the transaction does not proceed.

The invention claimed is:

1. A system for facilitating a financial transaction between a prospective transactor and a transactee, comprising:
   a) a point-of-sale device comprising a biometric scanner; a card reader; and an encrypter, wherein a card comprising details of at least one account held by the prospective transactor at a financial institution is read by the card reader and a biometric identifier of the prospective transactor is obtained from the biometric scanner, wherein details of the account comprise an account number;
   b) an identity and account verifying facility for verifying the identity of the prospective transactor and details of the account held by the prospective transactor with the financial institution, the identity and account verifying facility being operated by an independent verifier, the identity and account verifying facility comprising:
      i) a storage device in which is stored the biometric identifier of the prospective transactor and details of the account held by the prospective transactor at the financial institution, the details of the account having been checked with the financial institution;
      ii) a receiver module for receiving the biometric identifier and account details of the prospective transactor from the transactee, in which the received biometric identifier is verified by comparison with the corresponding stored biometric identifier stored against the account details;
      iii) a decrypter for decrypting encrypted data received from the transactee; and
      iv) a replying module for replying to the transactee in response to a request to verify the biometric identifier and account details of the prospective transactor.

2. A method of facilitating a financial transaction between a prospective transactor and a transactee, comprising:
   a) obtaining from the prospective transactor a biometric identifier and details of at least one account held by the prospective transactor at a financial institution, wherein the details of the account are obtained from a card by the transactee, wherein the details of the account comprise an account number;
   b) verifying the identity of the prospective transactor and details of the account held by the prospective transactor with the financial institution prior to the transactor conducting an electronic financial transaction with the transactee, wherein the verifying comprises an independent verifier:
      i) receiving from the transactee a biometric identifier of the prospective transactor and details of the account held by the prospective transactor;
      ii) verifying the received biometric identifier by comparing it with a corresponding stored biometric identifier stored against the account details;
      iii) decrypting encrypted data received from the transactee, wherein the encrypted data comprises the biometric identifier of the prospective transactor and details of the account held by the prospective transactor at the financial institution; and
      iv) replying to the transactee to verify the biometric identifier and details of the account held by the prospective transactor.

3. The system of claim 1, in which the identity and account verifying facility includes a biometric scanner whereby the transactor may enter his biometric identifier.

4. The system of claim 3, in which the identity and account verifying facility includes a card reader for obtaining details of the account held by the prospective transactor with the financial institution.

5. The method of claim 2, further comprising the verifier obtaining the biometric identifier of the prospective transactor and details of the account held by the prospective transactor at the financial institution, confirming his identity and the account details and storing the biometric identifier of the prospective transactor together with details of the account held by the transactor at the financial institution, prior to the transactor conducting any transaction.

\* \* \* \* \*